(12) United States Patent
Keum et al.

(10) Patent No.: US 9,696,977 B2
(45) Date of Patent: Jul. 4, 2017

(54) METHOD AND SYSTEM FOR ALLOCATING ID OF SOFTWARE COMPONENT

(75) Inventors: Ji-Eun Keum, Suwon-si (KR); Hae-Young Jun, Anyang-si (KR); Wuk Kim, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1515 days.

(21) Appl. No.: 12/131,409

(22) Filed: Jun. 2, 2008

(65) Prior Publication Data
US 2008/0301640 A1 Dec. 4, 2008

(30) Foreign Application Priority Data

Jun. 1, 2007 (KR) .................. 10-2007-0053670
Aug. 18, 2007 (KR) .................. 10-2007-0083087

(51) Int. Cl.
G06F 9/44 (2006.01)
G06F 9/445 (2006.01)
H04W 4/00 (2009.01)

(52) U.S. Cl.
CPC ............... *G06F 8/60* (2013.01); *G06F 8/61* (2013.01); *H04W 4/001* (2013.01); *H04W 4/003* (2013.01)

(58) Field of Classification Search
CPC ....................................................... G06F 8/60
USPC ....................................................... 717/120
See application file for complete search history.

(56) References Cited

U.S. PATENT DOCUMENTS

| 6,993,664 | B2 | 1/2006 | Padole et al. |
| 7,076,784 | B1 | 7/2006 | Russell et al. |
| 7,472,385 | B2 * | 12/2008 | Chamberlain et al. ... G06F 8/65 717/169 |
| 7,823,146 | B2 * | 10/2010 | Surace ...................... G06F 8/61 717/168 |
| 2004/0093599 | A1 | 5/2004 | Reynaud |
| 2006/0020947 | A1 * | 1/2006 | Hallamaa et al. ............ 719/317 |
| 2006/0190608 | A1 * | 8/2006 | Sahinoja et al. ............. 709/227 |

FOREIGN PATENT DOCUMENTS

| KR | 10-2004-0053781 A | 6/2004 |
| WO | 00/77614 A2 | 12/2000 |
| WO | 2005/106654 A1 | 11/2005 |

OTHER PUBLICATIONS

Open Mobile Alliance, Generic Content Download Over the Air Specification Version 1.0, Internet Citation, Jun. 10, 2002.

\* cited by examiner

*Primary Examiner* — Wei Zhen
*Assistant Examiner* — Lanny Ung
(74) *Attorney, Agent, or Firm* — Jefferson IP Law, LLP

(57) ABSTRACT

A method for allocating an identifier (ID) of a software component is disclosed. The method includes generating information on software components by a Device Management (DM) server, generating a download package including the information on software components by the DM server, transmitting the download package from the DM server to a DM client, executing the download package by the DM client, and allocating an ID to each software component based on the information on software components if the download package is executed by the DM client.

17 Claims, 7 Drawing Sheets

METHOD AND SYSTEM FOR ALLOCATING ID OF SOFTWARE COMPONENT

PRIORITY

This application claims the benefit under 35 U.S.C. §119(a) of a Korean patent application filed in the Korean Industrial Property Office on Jun. 1, 2007 and assigned Serial No. 2007-53670, and of a Korean patent application filed on Aug. 18, 2007 and assigned Ser. No. 2007-83087, the entire disclosures of both of which are hereby incorporated by reference.

BACKGROUND OF THE INVENTION

1. Field of the Invention

The present invention relates to a method and a system for managing a number of wireless devices. More particularly, the present invention relates to a method and system for allocating an Identifier (ID) of a software component in an Open Mobile Alliance (OMA) Device Management (DM) system.

2. Description of the Related Art

Because of rapid increases in the number of wireless terminals, there is a need for a standardized method for managing wireless devices. To address this need, Mobile Device Management (MDM) methods have been developed in order to manage firmware, software, parameters, a schedule, etc., of a relevant terminal while a wireless carrier or a service provider communicates with the terminal. Representative MDM methods as described above include an OMA DM method which has been developed by the OMA for making application standards of wireless devices. By reading, adding, changing, or executing an object of a mobile terminal by using a DM protocol, the OMA DM method can manage firmware, software, parameters, etc., within the mobile terminal.

In the OMA DM method, terminals to be managed are defined as Management Objects (MOs). A DM client and a DM server deliver the MOs by using the DM protocol, thereby implementing terminal management. The MOs are interfaces of a data model which the DM server and the DM client can access. OMA standards define MOs depending on each service intended to be provided by using the DM protocol.

A Software COmponent Management Object (SCOMO) among the MOs as described above is an MO defined in order to collect various pieces of information on software existing in the mobile terminal. Also, an SCOMO enabler is a solution for wirelessly managing the software. The SCOMO enabler within the OMA DM is a database-type interface for continuous management of a wireless device by the DM server, including downloading software components to the wireless device, updating the components, and deleting them from the wireless device.

FIG. 1 illustrates a tree structure of a conventional SCOMO.

Referring to FIG. 1, a conventional SCOMO includes an inventory node and a download node, and the inventory node includes a deployed node and a delivered node.

Information on a software package to be downloaded from a DM server is included in the download node. The delivered node includes information on a software package which has been downloaded but is not installed yet. After a software package is downloaded, in order to receive and execute management instructions (i.e. update or delete) that are continually performed by the DM server henceforth, the software package is stored in a mobile device in an MO form on a component-to-component basis. Namely, the software package exists as components under the deployed node.

The inventory node is a node in which values regarding software components that are installed or downloaded on/to a mobile terminal are stored. The inventory node includes the deployed node and the delivered node as described above. In the deployed node, information on software components currently installed on the mobile terminal and used thereby is stored. The delivered node includes information on a software package which has been downloaded to the mobile terminal and stored therein, but is not yet installed thereon. Also, the download node includes information on a software package which is expected to be newly downloaded, or is being downloaded from the DM server to the mobile terminal.

At least one Deployed Component (DC) can be generated from one downloaded software package. Deployed/x/ID represents an Identifier (ID) of the DC, and a current OMA DM specification defines that the mobile device allocates an ID to each DC.

Therefore, only the DM client (i.e. the mobile device) is aware of the ID of each DC, while the DC server is unaware. Also, the OMA DM specification does not describe contents regarding how name and version values within a deployed MO are specified.

If ID, name, and version values of a software package are equal to ID, name, and version values of a DC, respectively, the values of the software package may be inherited as the values of the DC. However, if ID, name, and version values of a software package are not equal to ID, name, and version values of a DC, respectively (e.g. when multiple DCs exist within the software package and the DCs have different IDs, names, and version values), it is ambiguous as to how the ID, name, and version value of each DC can be determined.

If this happens, when the DM server performs subsequent DM (e.g. when the DM server updates DCs), the DM server does not know which DC it must manage, which causes problems.

As a result, when the DM server intends to manage software by using the SCOMO in the OMA DM method, technology for correctly identifying a software component is required.

SUMMARY OF THE INVENTION

An aspect of the present invention is to address the above-mentioned problems and/or disadvantages and to provide at least the advantages described below. Accordingly, an aspect of the present invention is to provide a method and a system for allocating an ID of a software component in OMA DM, in which a DM server identifies and selects DCs, and can then correctly manage the DCs, when software components downloaded in a package form are installed on a mobile device and are stored therein as multiple DCs, and then the DM server continues to perform subsequent management (update/removal) of the DCs on a DC-to-DC basis.

In accordance with an aspect of the present invention, a method for allocating an ID of a software component is provided. The method includes generating information on software components by a Device Management (DM) server, generating a download package including the information on the software components by the DM server, transmitting the download package from the DM server to a DM client, executing the download package by the DM client, and allocating an ID to each of the software components based on the information on the software components if the download package is executed, by the DM client.

In accordance with another aspect of the present invention, a method for allocating an ID of a software component is provided. The method includes providing a first sub-node for describing information on software components to a download Management Object (MO) of a Software COmponent Management Object (SCOMO), providing a second sub-node for describing originator information of the software components to a deployed MO of the SCOMO, transmitting the SCOMO to a DM client, downloading a software package from a DM server according to an execution command of the DM client, and allocating an ID to each installed software component based on contents of the first sub-node of the download MO when installing the software package.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiment of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions will be omitted for clarity and conciseness.

Figure 1:
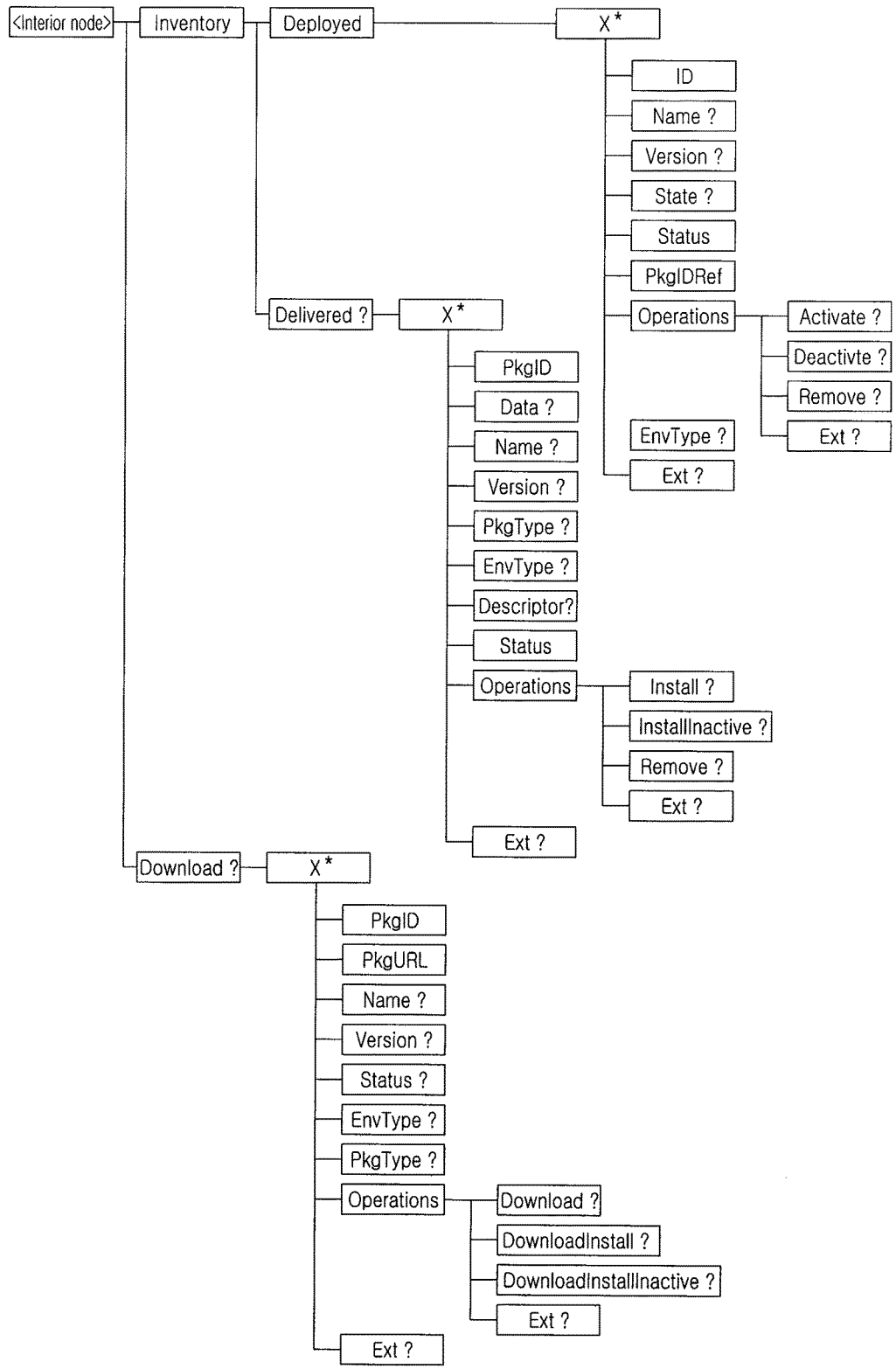
FIG. 1 illustrates a tree structure of a conventional Software COmponent Management Object (SCOMO)

As will be explained in more detail below, exemplary embodiments of the present invention include a DM server for remotely managing software of a mobile device and a client for software management within the mobile device. An SCOMO is defined between the DM server and the DM client. By using a DM protocol and an SCOMO, the DM client can share information about the software within the mobile device with the DM server, and download/install new software to/on the mobile device or update/remove previously installed software. The DM server identifies and recognizes each software package installed in the device, based on an ID of each deployed MO subordinate to the inventory node illustrated in FIG. 1. Hence, the DM server should know the contents included in each deployed component, in order to perform continuous management of each deployed component.

Therefore, the DM server and the DM client must share information including respective IDs of the deployed components. To this end, a node which enables the DM server and the DM client to share information on the deployed MO is defined under a download MO. Otherwise, information, such as the respective IDs of the deployed components, etc., is added within a delivery package, which, in turn, is downloaded to the DM client (i.e. the mobile device). Otherwise, a node having the values of originator, name, and version is defined so that any DM server can differentiate among the deployed components.

An object intended to be managed through the SCOMO includes not only software packages downloaded from the DM Server (DMS), but also software packages installed on the mobile device off-line. In the former case, the ability to identify a software component within a relevant DMS is required. In the latter case, regardless of what DMS is connected, the connected DMS is required to be capable of managing the software. Accordingly, the ability to identify a software component in a unique manner is required.

The present invention proposes a method for providing a unique ID for identifying a DC within a DMS through sharing of a software package and a component ID between the DMS and a device.

Figure 2:
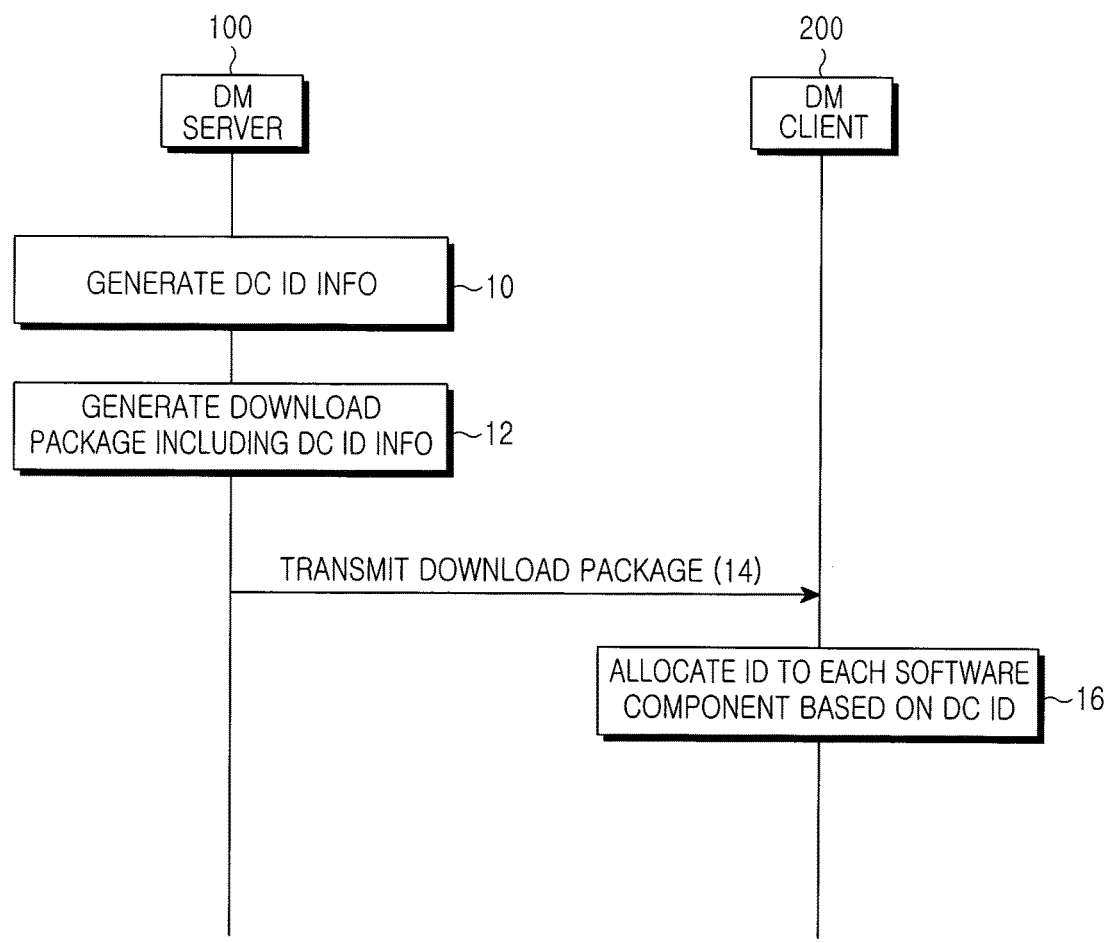
FIG. 2 is a flow diagram illustrating a process for allocating an ID to each software component according to an exemplary embodiment of the present invention.

FIG. 2 is a flow diagram illustrating a process for allocating an ID to each software component according to an exemplary embodiment of the present invention.

According to an exemplary embodiment of the present invention, when a DM server downloads a software package to a DM client, the DM server can provide the DM client with information on a DC. Also, when the DM server transmits a download MO to the DM client, it can provide the DM client with the information on DCs.

To this end, in an exemplary embodiment of the present invention, metadata including the information on the DC is added to the software package, or a new node having the information on the DC can be provided within a download MO.

Referring to FIG. 2, a DM server 100 generates DC identification information in step 10. In an exemplary implementation, the generated DC identification information may include only an ID of a DC. In another exemplary implementation, DC identification information may include an ID of a DC and a file or contents of the DC.

In an exemplary implementation, when an ID of a DC is DC_1 and a file thereof is xxx.exe, DC identification information describes the ID and the file thereof in a pair form, such as {DC_1, xxx.exe}. Namely, it may be {DC_1, xxx.exe}, {DC_2, xx.dll}, etc. An ID of each DC is, for example, a value determined by the DM server 100, and contents included in each DC are, for example, values determined by an originator. Also, the DCs configuring a software package and how a DC is configured comply with the implementation of the originator.

Table 1 below illustrates an example of DC identification information according to an exemplary embodiment of the present invention.

TABLE 1

| DC ID (appointed by DM server) | Contents of DC (identifiers or file names) (appointed by originator) |
|---|---|
| DC_01 | *.dll |
|  | *.exe |
|  | *.bin |
| DC_02 | **.dll |
|  | **.exe |
|  | **.bin |
| DC_03 | ***.dll |
|  | ***.exe |
|  | ***.bin |

In step 12, the DM server 100 generates a download package having the DC identification information generated in step 10. Namely, the DM server 100 inserts the generated DC identification information into the generated download package. Herein, the download package is defined as the concept including a download MO and a software package.

More specifically, the DM server 100 can insert the generated DC identification information into the download MO included in the download package, or can insert the generated DC identification information into the software package included in the download package.

In other words, a method for inserting the DC identification information into the download package (i.e. the generation of the download package having the DC identification information) can be implemented in a scheme for including DC identification information in a download MO or in a scheme for including DC identification information in a software package.

When the DC identification information is inserted into the download MO according to an exemplary embodiment, a new node is defined under a download MO of an SCOMO, thereby allocating an ID value to each DC. In an exemplary embodiment of the present invention, the new node is referred to as a "DC information node (DCinfo)." The DCinfo describes an ID and files or contents of at least one DC generated after a mobile device installs a relevant software package thereon.

Figure 3:
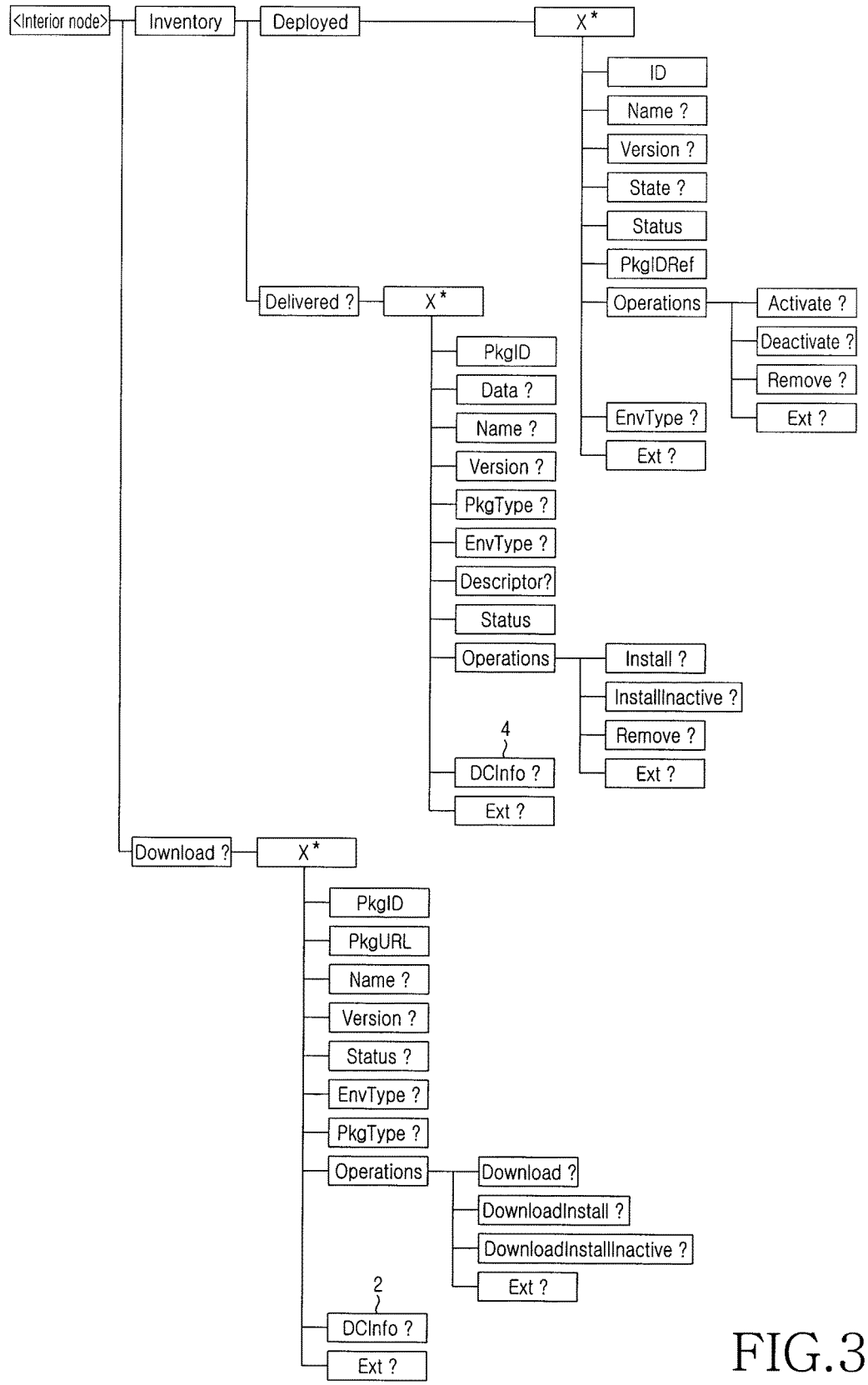
FIG. 3 illustrates a tree structure of an SCOMO according to an exemplary embodiment of the present invention.

FIG. 3 illustrates a tree structure of an SCOMO according to an exemplary embodiment of the present invention.

Referring to FIG. 3, a DC information node (DCinfo) 2 exists as a sub-node of a download MO. Also, a DCinfo 4 exists as a sub-node of a delivered MO. As described above, the DCinfo under the delivered MO is optional, and thus may not exist depending on each implementation.

When the DC identification information is inserted into the software package according to an exemplary embodiment, metadata of the software package is configured to include IDs of DCs and files or contents of each of the DCs.

As described above, the DM server 100 inserts the generated DC identification information into the software package or the download MO, and generates a download package having the software package and the download MO.

Referring again to FIG. 2, in step 14, the DM server 100 transmits the generated download package to the DM client 200. At this time, the transmission of the download package is performed in an order in which the download MO is first transmitted and the software package is then transmitted.

After the download package is transmitted to the DM client 200, the software package or a delivery package within the download package is installed. Then, the DM client 200 respectively allocates IDs to software components based on information included in the metadata of the software package or information included in the DCinfo of the download MO in step 16. Meanwhile, if the software package is not installed in the mobile device after the download package is transmitted to the DM client 200, a delivered MO form regarding the software package exists. Accordingly, DCinfo including information on respective IDs of DCs is also necessary under the delivered MO.

When an ID of a DC is provided through the download MO, a DCinfo under the download MO is a mandatory node, but a DCinfo under the delivered MO is optional. This is because the software package can be either downloaded from the DM server or provided off-line by a user. In this case, the delivered MO may not require the DC information node (DCinfo).

Hereinafter, a detailed description will be made of the transmission of the download package including the DC identification information.

Figure 4:
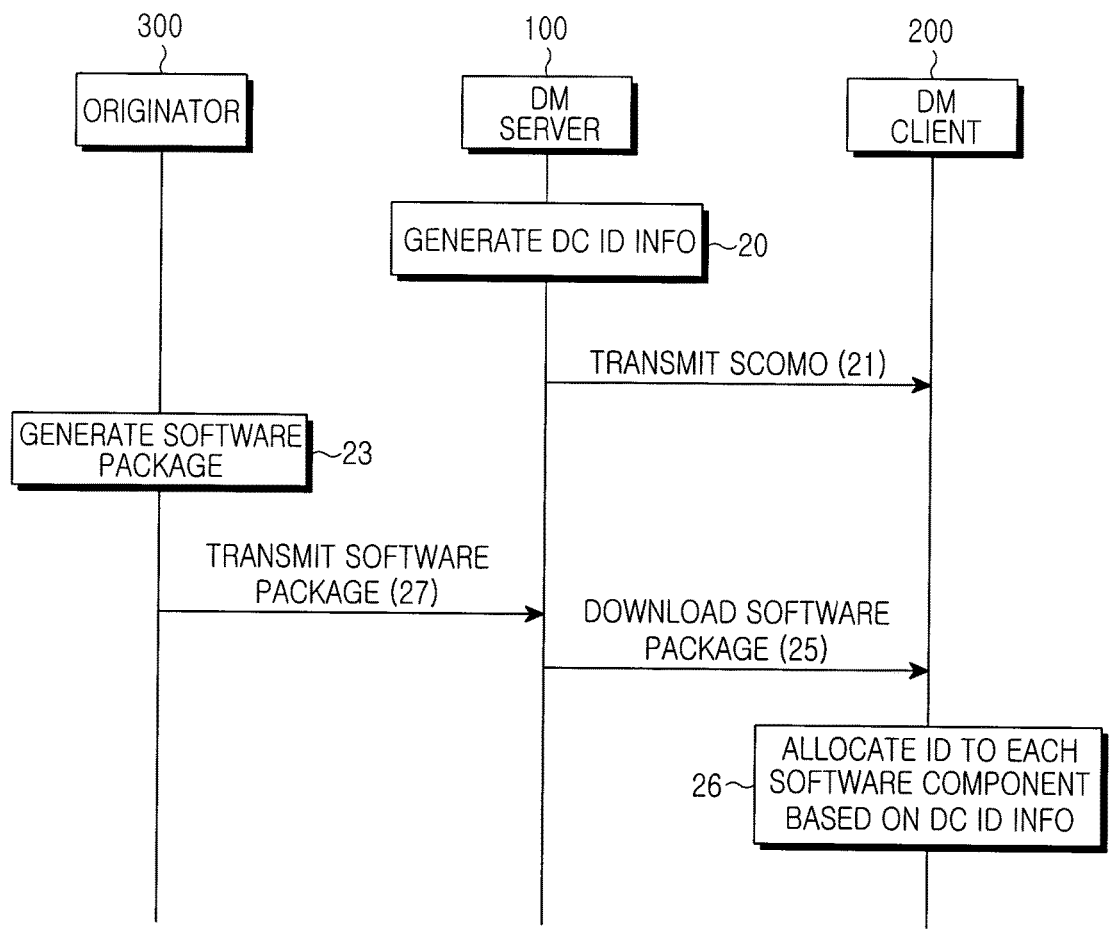
FIG. 4 is a flow diagram illustrating the generation and transmission of a download package illustrated in FIG. 2 according to an exemplary embodiment of the present invention.

FIG. 4 is a flow diagram illustrating the generation and transmission of the download package illustrated in FIG. 2 according to an exemplary embodiment of the present invention.

Referring to FIG. 4, the DM server 100 generates DC identification information having information on a DC in step 20. Then, the DM server 100 transmits an SCOMO to the DM client 200 in step 21. According to an exemplary embodiment of the present invention, the SCOMO may include DC identification information. In this case, the DM server 100 generates a DCinfo as a sub-node of a download MO of the SCOMO, and inserts the DC identification information into the generated DCinfo. Then, an originator 300, for example a software developer, generates a software package in step 23, and transmits the generated software package to the DM server 100 in step 27. The generated software package can include multiple software components.

In step 25, the DM server 100 downloads the received software package to the DM client 200. According to another exemplary embodiment of the present invention, the software package may include the DC identification information. In this case, the DM server 100 inserts respective IDs of DCs and files or contents of each of the DCs into metadata of the software package.

Thereafter, for example, after the software package has been installed in the mobile device according to an execution command, in step 26, the DM client 200 allocates an ID to a software component by using DC identification information included in the DCinfo of the SCOMO or DC identification information included in the metadata of the software package. Meanwhile, one software component may include either one file or multiple files.

Figure 5:
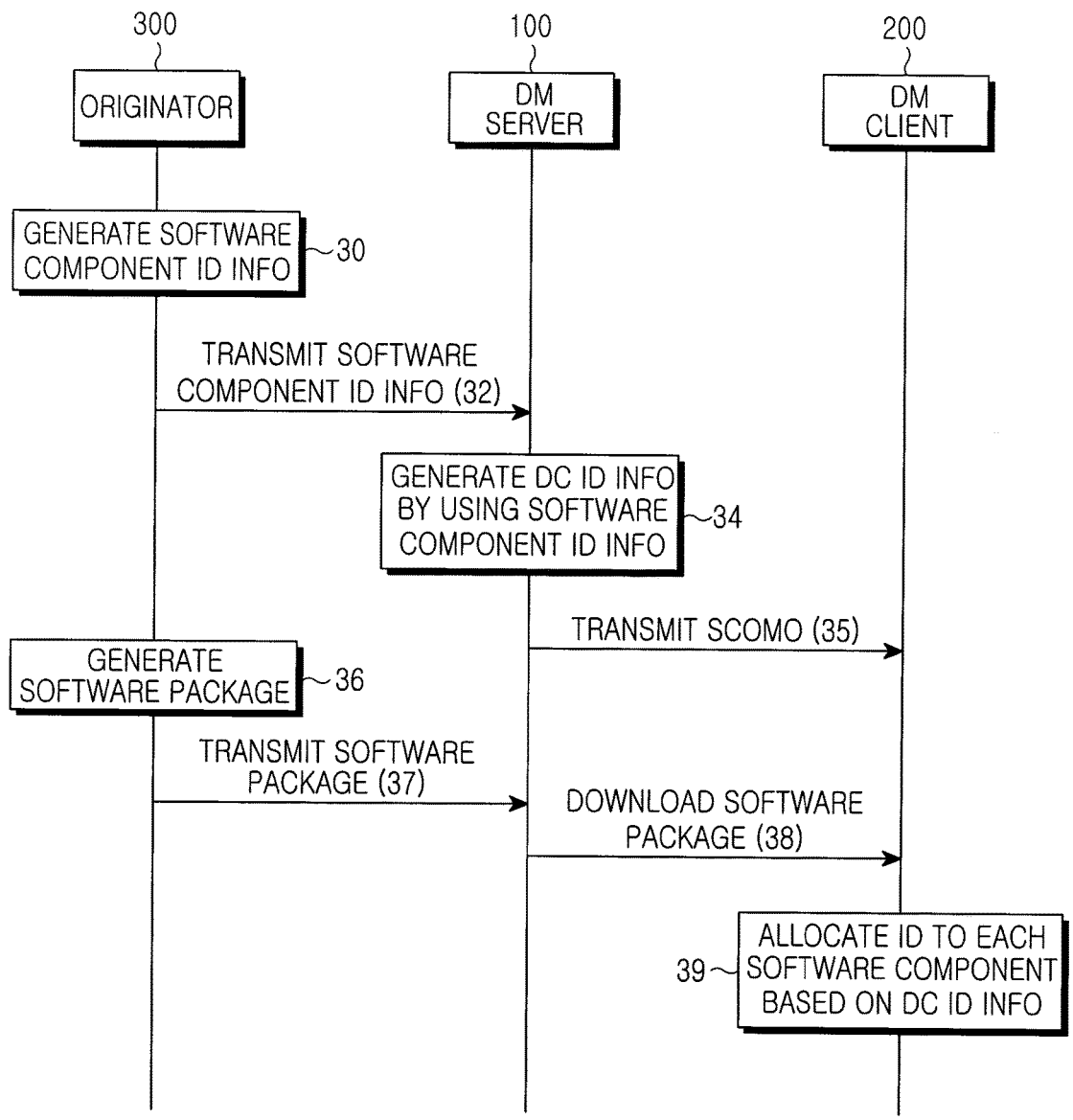
FIG. 5 is a flow diagram more specifically illustrating the generation and transmission of the download package illustrated in FIG. 2 according to an exemplary embodiment of the present invention.

FIG. 5 is a flow diagram specifically illustrating the generation and transmission of the download package illustrated in FIG. 2 according to another exemplary embodiment of the present invention. In another exemplary embodiment, a software developer provides a software component ID usable by all DM servers. Namely, when the software developer provides a software component ID to the DM server, the DM server provides the received software component ID to the DM client.

More specifically, a delivery component needs to have a unique ID, so that any server can manage the software component installed in the mobile device. An ID of a deployed MO can have a unique identification value with {originator, name, version}. Herein, the originator signifies a subject that produces and provides software. Also, the name is required to be a name specified by the developer itself. For instance, a software component named "MS world_schema.gif" with version 1.0 produced by Microsoft is unique. The originator of a software component generates identification information on the software components, and provides the generated identification information to the DM server. The DM server receives the identification information on the relevant software component from the originator of the software component, and then provides the DM client with the received identification information on the relevant software component.

Referring to FIG. 5, an originator 300 generates identification information on a software component in step 30, and in step 32, provides a DM server 100 with the generated identification information on the software component. A name of the software component, i.e. DC, is different from a name of the software package, and thus information necessary to determine the name of the DC must be provided by the originator. Also, since a version value of the software component may be different from a version value of the software package, information on the version value of each DC must be provided by the originator.

According to an exemplary embodiment of the present invention, information on originator, name, and version of each DC having a different name from that of the software package (i.e. software component identification information) is delivered to the DM server 100. In step 34, the DM server 100 generates DC identification information by using the delivered software component identification information. In step 35, the DM server 100 transmits an SCOMO to a DM client 200. In this case, the DM server 100 may insert the DC identification information into the SCOMO according to an exemplary embodiment. More specifically, a DCinfo is provided as a sub-node of a download node of the SCOMO in order to deliver information on an originator, a name, and a version of a DC having originator, name, and version values different from those of the software components of the software package.

At this time, the contents of a DCinfo of a download node according to an exemplary embodiment of the present invention may be different from those of a DCinfo of a download node according to another exemplary embodiment thereof.

According to an exemplary embodiment of the present invention, a DCinfo includes IDs of DCs and files or contents of each of the DCs. According to another exemplary embodiment thereof, a DCinfo includes respective originator, name, and version values of DCs.

Also, an originator node can be provided as a sub-node of a deployed MO within a tree structure of an SCOMO according to another exemplary embodiment of the present invention.

Further, referring to the DC identification information included in the transmitted SCOMO, the DM client 200 can configure the contents of the originator node of the deployed MO.

In the case of DCs installed off-line by the DM client 200 (i.e. on the mobile device), it is impossible to bring values from a DCinfo of a download MO. Namely, the DM server 100 cannot provide information on the DC installed off-line. Accordingly, when the DM client 200 installs the DC provided off-line in the mobile device, it determines an ID of each DC in the form of {originator, name, version} by using originator, name, and version values of each DC. In this case, the DM client 200 can receive the originator, name, and version values of each relevant DC from a developer thereof.

Figure 6:
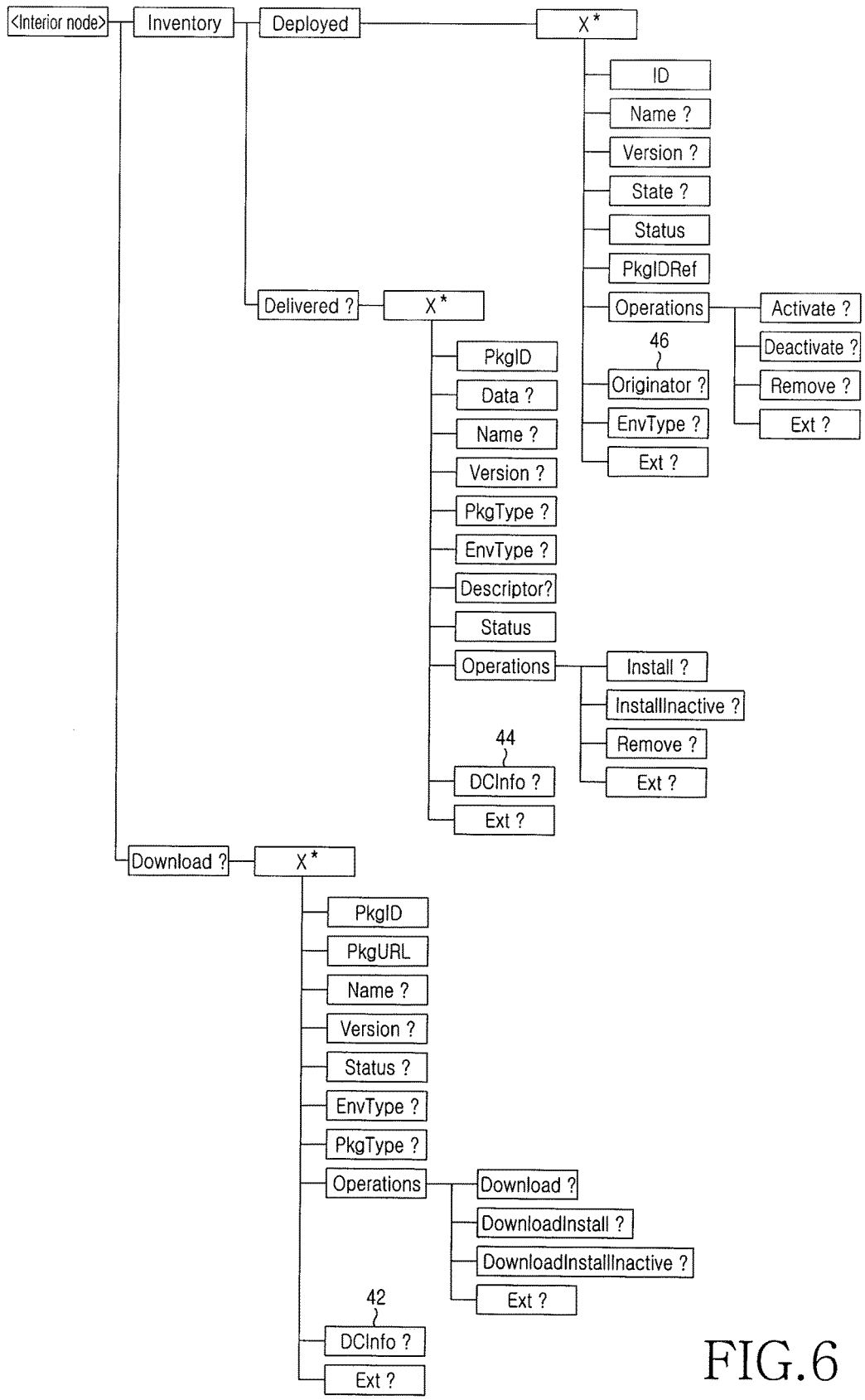
FIG. 6 illustrates a tree structure of an SCOMO according to an exemplary embodiment of the present invention.

FIG. 6 illustrates a tree structure of an SCOMO according to another exemplary embodiment of the present invention.

Referring to FIG. 6, a DCinfo 42 is provided as a sub-node of a download MO according to another exemplary embodiment of the present invention. Also, a DCinfo 44 can be provided as a sub-node of a delivered MO. The DCinfo 44 under the delivered MO is optional and thus may not exist depending on each implementation. Optionally, an originator node 46 is provided as a sub-node of the deployed MO. An originator value of a relevant DC is stored in the originator node 46.

Table 2 below illustrates contents included in a DCinfo according to another exemplary embodiment of the present invention.

TABLE 2

| Content of DC (identifier or file name) | Originator | Name | Version |
|---|---|---|---|
| 1 | MS | World_DC1 | 1.0 |
| 2 | MS | Excel_DC1 | 1.0 |
| 3 | MS_Sub | Visio_DC1_1 | 1.1 |
| . | . | | |
| . | . | | |
| . | . | | |

As shown in Table 2, a DCinfo describes an ID value of each DC including originator, name, and version values thereof.

As described above, contents of a DCinfo according to an exemplary embodiment of the present invention are different from those of a DCinfo according to another exemplary embodiment of the present invention.

As described above, when the DM server 100 generates a new SCOMO and then delivers the generated SCOMO, it can deliver a unique ID related to a DC to the DM client 200.

Referring again to FIG. 5, in step 36, the originator 300, for example a software developer, generates a software package, and in step 37, transmits the generated software package to the DM server 100. The software package can include multiple software components. Accordingly, the DM server 100 downloads the software package to the DM client 200 in step 38.

The software package can include DC identification information according to another exemplary embodiment of the present invention. In this case, the DM server 100 inserts IDs of DCs and files or contents of each of the DCs into metadata of the software package.

Thereafter, for example, after the software package is installed in the mobile device according to an execution command, in step 39, the DM client 200 allocates an ID to each software component based on DC identification information included in the DCinfo of the SCOMO or DC identification information included in the metadata of the software package.

Figure 7:
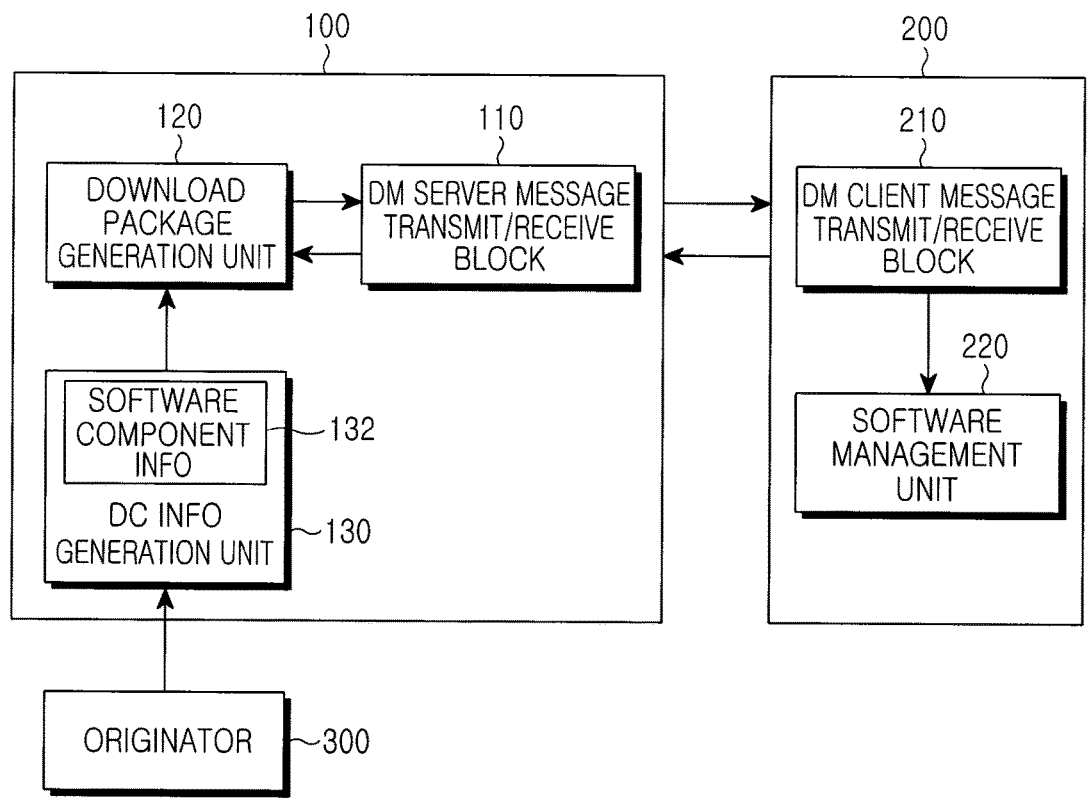
FIG. 7 is a block diagram illustrating a system for allocating an ID to each software component according to exemplary embodiment of the present invention.

FIG. 7 is a block diagram illustrating a system for allocating an ID to each software component according to an exemplary embodiment of the present invention.

Referring to FIG. 7, the DM server 100 can be provided with information on software components by the originator 300. The information on software components can be previously stored in the DM sever 100.

A DC information generation unit 130 of the DM server 100 generates DC identification information by using the information on software components 132. According to an exemplary embodiment of the present invention, the DC identification information represents IDs of DCs and files or contents of each of the DCs. At this time, the DC identification information may include either only the IDs of the DCs or both of the IDs of the DCs and the files or contents of each of the DCs.

According to another exemplary embodiment of the present invention, the DC identification information represents an originator, a name, and a version. After the DC information generation unit 130 generates the DC identification information, it provides the generated DC identification information to a download package generation unit 120. The download package generation unit 120 inserts the DC identification information received from the DC information generation unit 130 into an SCOMO or a software package, generates a download package including the SCOMO and the software package, and then transmits the generated download package to the DM client 200 through a DM server message transmit/receive block 110.

As described above, the download package is defined as the concept of including the download MO and the software package. Accordingly, the generation of the download package having the DC identification information can be implemented in a scheme for inserting DC identification information into a download MO or in a scheme for including DC identification information in a software package.

When the DM client 200 receives the SCOMO and a relevant software package through a DM client message transmit/receive block 210, it transmits them to a software management unit 220. The software management unit 220 installs the received software package in the mobile device, and then allocates an ID to each software component based on information included in a DCinfo of the received SCOMO or metadata of the software package.

Optionally, when the software management unit 220 installs the download package according to an execution command, it may generate one or more deployed MOs. In this case, the software management unit 220 not only allocates an ID to each DC based on the DC identification information included in the DCinfo, but also stores an originator value of each DC in an originator node under the deployed MO.

In the present invention, when a DM server receives a list of software components installed in a mobile device in an MO form, it identifies a relevant software component based on the ID of the software component, and then performs software management, such as update, activation, deactivation, removal, and the like.

While the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims and their equivalents.

What is claimed is:

1. A method for allocating an identifier (ID) of a software component by a Device Management (DM) client, the method comprising:

receiving a download package from a DM server, wherein the download package includes deployed component information and a package identifier, and wherein the deployed component information is used for uniquely identifying software components after the software components are installed in the DM client;

executing the download package and installing the software components in the DM client;

generating a deployed component ID for each of the software components according to the deployed component information, after the download package is executed, wherein the deployed component ID is not inherited from the package identifier; and allocating the deployed component ID to each of the software components;

wherein the deployed component information is used by the DM client for distinguishing each of the software components, and wherein the software components installed in the DM client are updated, removed, activated, or deactivated by the DM server based on the deployed component information.

2. The method as claimed in claim 1, wherein the deployed component information comprises at least one of deployed component IDs of the software components and contents of the software components.

3. The method as claimed in claim 1, wherein the receiving of the download package comprises receiving the download package by a software management unit of the DM client.

4. A method for allocating an identifier (ID) of a software component by a Device Management (DM) client, the method comprising:

receiving, from a DM server, a Software Component Management Object (SCOMO) including deployed component information for uniquely identifying a software component after the software components are installed in the DM client, wherein the SCOMO includes a first information node including deployed component information and a second information node including a package identifier;

downloading a software package from the DM server according to an execution command of the DM client and installing the software components in the DM client;

generating a deployed component ID for each of the software components according to the deployed component information, after installing the software package, wherein the deployed component ID is not inherited from the package identifier; and allocating the deployed component ID to each of the software components, wherein the deployed component information is used by the DM client for distinguishing each of the software components, and wherein the software components installed in the DM client are updated, removed, activated, or deactivated based on the deployed component information.

5. The method as claimed in claim 4, wherein the deployed component information comprises at least one of deployed component IDs of the software components and contents of the software components.

6. The method as claimed in claim 4, wherein the receiving of the SCOMO comprises receiving the SCOMO by a software management unit of the DM client.

7. A method for allocating an identifier (ID) of a software component by a Device Management (DM) client, the method comprising:

receiving, from a DM server, a Software Component Management Object (SCOMO);

downloading a software package from the DM server according to an execution command of the DM client, wherein the software package includes deployed component information uniquely identifying the software components after the software components are installed in the DM client and a package identifier;

installing the software components in the DM client;

generating a deployed component ID for each of the software components according to the deployed component information, after installing the software package, wherein the deployed component ID is not inherited from the package identifier; and allocating the deployed component ID to each installed software component, wherein the deployed component information is used by the DM client for distinguishing each of the software components, and wherein the software components installed in the DM client are updated, removed, activated, or deactivated by the DM server based on the deployed component information.

8. The method as claimed in claim 7, wherein the deployed component information comprises at least one of deployed component IDs of the software components and contents of the software components.

9. The method as claimed in claim 7, wherein the receiving of the SCOMO comprises receiving the SCOMO by a software management unit of the DM client.

10. A method for allocating an identifier (ID) of a software component by a Device Management (DM) client, the method comprising:

receiving a Software Component Management Object (SCOMO) from a DM server, wherein a download Management Object (MO) of the SCOMO includes a first sub-node describing deployed component information for uniquely identifying software components after the software components are installed in the DM client a package identifier, and a deployed MO of the SCOMO includes a second sub-node describing originator information of the software components;

downloading a software package from a DM server according to an execution command of the DM client and installing the software components in the DM client;

during installation of the software components, generating a deployed component ID for each of the software components according to contents of the first sub-node of the download MO, wherein the deployed component ID is not inherited from the package identifier; and allocating the deployed component ID to each of the software components, wherein the deployed component information is used by the DM client for distinguishing each of the software components, and wherein the software components installed in the DM client are updated, removed, activated, or deactivated by the DM server based on the deployed component information.

11. The method as claimed in claim 10, wherein the deployed component information comprises originator information.

12. The method as claimed in claim 10, wherein the originator provides the deployed component information.

13. The method as claimed in claim 11, wherein the allocating of the deployed component ID to each installed software component comprises allocating the originator information to the second sub-node of the deployed MO.

14. The method as claimed in claim 10, wherein the deployed component information comprises at least one of deployed component IDs of the software components and contents of the software components.

15. The method as claimed in claim 10, wherein the receiving of the SCOMO comprises receiving the SCOMO by a software management unit of the DM client.

16. A method for allocating an identifier (ID) of a software component by a Device Management (DM) client, the method comprising:

receiving a download package from a DM server, the download package including deployed component information for uniquely identifying the software components after the software components are installed in the DM client and a package identifier;

executing the download package and installing the software components in the DM client;

generating a deployed component ID for each of the software components according to the deployed component information, after the download package is executed, wherein the deployed component ID is not inherited from the package identifier; and allocating the deployed component ID to each of the software components;

wherein the download software component is installed in the DM client, and the installed software component is identified by the DM server based on the deployed component information, wherein the deployed component information is used by the DM client for distinguishing each of the software components, and wherein the software components installed in the DM client are updated, removed, activated, or deactivated by the DM server based on the deployed component information.

17. A Device Management (DM) client for allocating an identifier (ID) of a software component, the DM client comprising:

a receiver for receiving a download package including deployed component information uniquely identifying the software components from a DM server after the software components are installed and a package identifier; and a processor for executing the download package, installing the software components in the DM client, generating a deployed component ID for each of the software components according to the deployed component information, after the download package is executed, and allocating the deployed component ID to each of the software components, wherein the deployed component ID is not inherited from the package identifier;

wherein the download software component is installed in the DM client, and the installed software component is updated, removed, activated, or deactivated by the DM server based on the deployed component information, and wherein the deployed component information is used by the DM client for distinguishing each of the software components.

* * * * *